Figure 4:
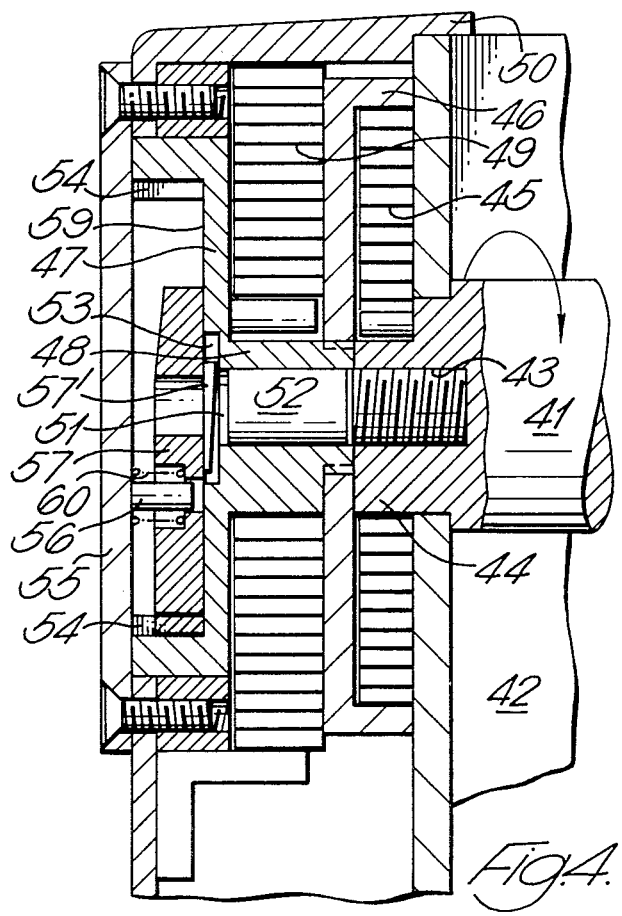

United States Patent [19]

Cunningham

[11] 4,215,830
[45] Aug. 5, 1980

[54] SAFETY BELT RETRACTORS

[75] Inventor: Douglas J. Cunningham, Steep Marsh, Nr. Petersfield, England

[73] Assignee: Britax (Wingard) Ltd., England

[21] Appl. No.: 47,975

[22] Filed: Jun. 13, 1979

[51] Int. Cl.³ .................. A62B 35/00; B65H 75/48
[52] U.S. Cl. .................... 242/107; 242/107.4 R
[58] Field of Search .................. 242/107, 107.4 R; 297/388; 280/802-804, 806-808

[56] References Cited
U.S. PATENT DOCUMENTS

| | | | |
|---|---|---|---|
| 3,984,063 | 10/1976 | Knieriemen | 242/107 |
| 4,088,281 | 5/1978 | Close | 242/107 |
| 4,113,200 | 9/1978 | Tanaka | 242/107 |
| 4,123,013 | 10/1978 | Bottrill et al. | 242/107 |

Primary Examiner—John M. Jillions
Attorney, Agent, or Firm—Steele, Gould & Fried

[57] ABSTRACT

A safety belt retractor of a type including a pair of springs and a spring lock out mechanism enabling only one of the springs to operate when the belt is worn, in order to reduce belt tension, and to enable both of the springs to operate when the belt is released, to ensure reliable belt retraction. The retractor includes a sun and planet gear assembly including a gear ring, a planet gear and a sun gear. A shaft which rotates when the safety belt is retracted is coupled to a main spring by the sun and planet gear assembly. A stop limits orbital motion of the planet gear when the shaft is rotated, whereby the shaft is drivably coupled to the main spring through the gear assembly. A spring lock out mechanism secures the gearing against rotation, after the belt has been extracted, whereby the main springs stores its wound energy and its drive is disconnected from the shaft. An auxiliary spring, which is also coupled to the shaft, then applies a light bias to the belt. The spring lock out mechanism is released in response to orbital motion of the planet gear, when driven by the shaft, after releasing the belt which is retracted by the auxiliary spring.

10 Claims, 5 Drawing Figures

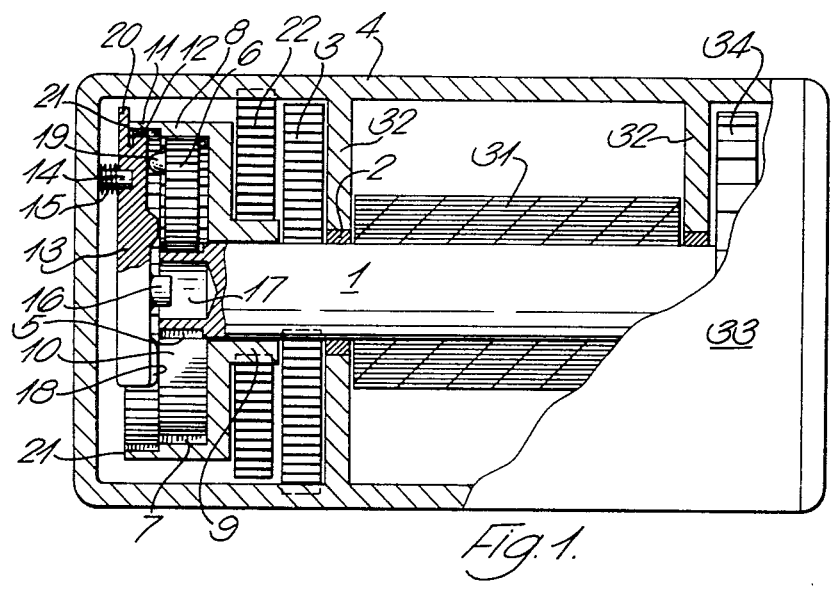
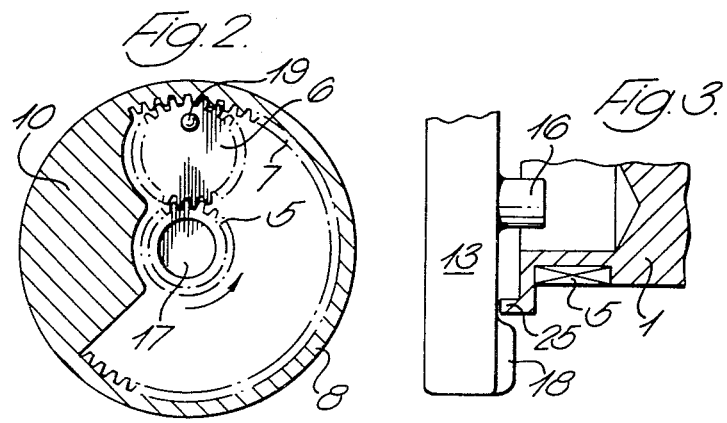

SAFETY BELT RETRACTORS

This invention relates to improvements in safety belt retractors of the type including a pair of springs, which may be connected in series or in parallel, and a spring lock out mechanism, which enables only one of the springs to operate when the belt is worn, in order to reduce belt tension, and both of the springs to operate when the belt is released, to ensure reliable belt retraction.

U.K. Pat. No. 1525151 describes such a type of belt retractor wherein a spring lock out mechanism includes a form of lost motion device which cooperates with a latching mechanism such as a releaseable ratchet and pawl. Both springs are wound up when the belt is extracted and then the main spring is locked out by the ratchet and pawl, whereby the belt tension is reduced. An auxiliary spring remains connected to the belt storage shaft to apply a light tension. A slight retraction of the belt, after it has been fastened about the wearer's torso, causes the ratchet and pawl to engage. The pawl is disengaged, after a predetermined lost motion, when the belt is released for rewinding onto the belt storage shaft. The lost motion device enables the storage shaft to rotate, by a few turns, before the pawl is disengaged so that both springs are again drivably connected to said shaft. The lost motion device preferably comprises a threaded engagement, such as a member which threadably engages and is coaxial with the belt storage shaft. The threaded member is axially displaced as the shaft rotates on belt extraction and the axial displacement is used to disengage the pawl from the ratchet.

A problem arises, however, when such a threaded member is used as the lost motion device. This problem arises because the main spring, which is disconnected when the belt is worn, rapidly drives the threaded member when the ratchet and pawl is released, before the main spring "catches up" with the auxiliary spring. As the main spring is substantially fully wound when the ratchet is released, the threaded member is accelerated to a high speed before it bottoms in a bore in which it is located. When the bottom of the bore is reached, the threaded member may become jammed or the threaded bore may be damaged, or both. This may be avoided by some form of cushioning at the bottom end of the bore but this does not relieve the high axial loads imposed by the threaded member in use.

The present invention seeks to solve this problem by providing a sun and planet gear assembly as the lost motion device. The sun and planet gear assembly cooperates with a spring lock out mechanism, preferably a ratchet and pawl whereby (a) the main spring is driven, due to rotation of said assembly with the belt storage shaft, when the belt is extracted, (b) the drive of the main spring is disconnected from said shaft, by said spring lock out mechanism, when the belt is initially released, and (c) the drive of the main spring is connected once more to said shaft following a predetermined lost motion due to orbital motion of one of the gears in said assembly, the spring lock out mechanism being disengaged by said one gear due to its orbital motion.

More specifically, the invention provides a safety belt retractor comprising a main spring, an auxiliary spring, a casing to which one end of each of said springs is anchored, a shaft which rotates when a safety belt is extracted and, retracted by the retractor, the auxiliary spring having its other end connected to said shaft for applying a continuous bias thereto, a sun and planet gear assembly including a gear ring, a planet gear and a sun gear, said shaft being coupled to the main spring by said sun and planet gear assembly, a stop to limit orbital motion of the planet gear when the shaft is rotated, whereby the shaft is drivably coupled to the main spring through said assembly, and a spring lock out mechanism for securing the gear ring against rotation, after the belt has been extracted, whereby the main spring stores its wound energy and its drive is disconnected from the shaft, said spring lock out mechanism being releasable in response to the orbital motion of the planet gear, when driven by the shaft, due to retraction of the belt by the auxiliary spring.

Preferably, the spring lock out mechanism is in the form of a ratchet and pawl. For example, the gear ring of the sun and planet gear assembly may include a toothed annulus engaged by a pawl which is tilted and pivoted away from the annulus to release the ratchet. The tilting and pivoting of the pawl may be effected by the planet gear which, during its orbital motion, comes into contact with the pawl. Preferably, the pawl is frictionally driven by a carrier which supports the gear ring such that, as the belt is extracted from the retractor, the pawl rotates together with the sun and planet gear assembly so that no ratchet noise is experienced. In the preferred embodiment of the invention, the pawl is located on the end of said belt storage shaft and is pivotable about biasing means which bears against an end wall of the retractor casing.

Preferably, the sun and planet gear assembly comprises a gear ring defined by internal teeth on a cup shaped member having a hollow stub to which said other end of the main spring is attached. The hollow stub is coaxial with the belt storage shaft and the end of the shaft defines, or has attached thereto, the sun gear wheel. The planet gear is fitted between the gear ring and the sun gear and may have a projection thereon for abutting the spring lock out mechanism, for example, the above mentioned pawl, during its orbital motion. The cup shaped member need not define a complete ring of teeth (the term "ring" being used herein to include a complete or incomplete circle of teeth). For example, the cup shaped member may include a solid sector joined by the respective ends of the arcuate toothed track formed by said gear ring which is engaged by the planet gear. This sector is spaced from the sun gear and acts as an abutment for limiting the orbital motion of the planet gear in both clockwise and anticlockwise directions.

The term sun and planet gear is used herein to include different constructions of epicyclic gear assemblies including, for example, bevel gears or other instructions where orbital motion or rotation may not be in the same plane as the main drive.

Figure 5:
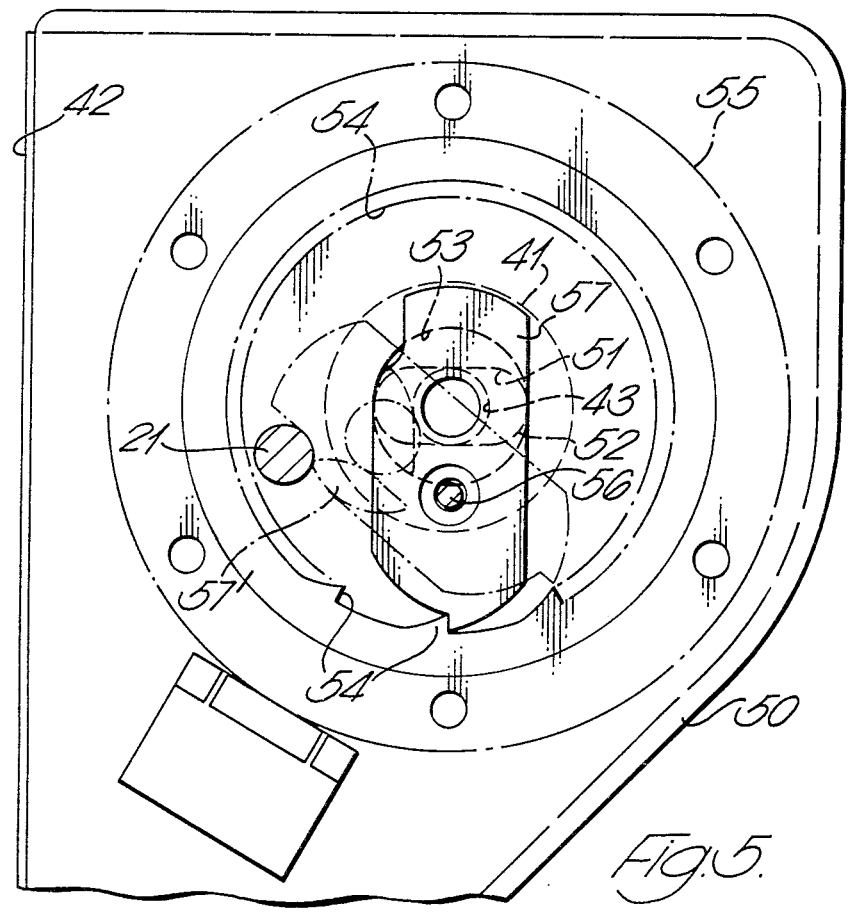

The preferred embodiment of the invention will now be described with reference to the accompanying schematic drawings, in which:

FIG. 1 is a sectional elevation through a safety belt retractor showing, in particular, the belt rewinding mechanism, FIG. 2 is a sectional end elevation of the retractor showing a sun and planet gear assembly, FIG. 3 is a detail view, in section, of a part of the retractor, and FIGS. 4 and 5 are respectively sectional side and end elevations of a safety belt rewinding mechanism according to previous design (these figures being included to illustrate the action of a lost motion device comprising a threaded member moving axially of a belt storage shaft).

Referring to FIG. 1, the retractor comprises a belt storage shaft or reel spindle 1 which extends between bearings 2 supported in frame members 32 of a reel frame or housing 4. A safety belt 31, wound on shaft 1, has its inner end fixed to the shaft. The housing 4 has an opening through which the belt is extracted thereby causing the shaft 1 to rotate to wind up a pair of clock-type springs 3 and 22 which thereby apply a retraction bias to the belt. On the opposite side of the housing is an end cap 33, which is shown partly sectioned to reveal a ratchet wheel 34 fast with the shaft 1. The end cap 33 houses a known locking mechanism such as the so-called "inertia" type in which a ball or pendulum moves to cause a pawl to engage ratchet wheel 34 to lock the retractor. The inertia type locking mechanism may be used in combination with a mechanism sensitive to sudden extraction of belt 31 also to cause the retractor to be locked, for example, by causing the pawl to engage ratchet wheel 34. Such mechanisms are not illustrated or described in detail as they are well known in the art.

Spring 22, which is the main spring, is stronger than the auxiliary spring 3. Each of the springs has an outer end fixed to the housing 4. Spring 3 has its inner end connected to the shaft 1 in order to provide a drive at all times, and in particular, to apply a light bias to the belt 31 when worn. The inner end of spring 22 is connected to a boss or sleeve-shaped portion 9 which extends from a cup-shaped carrier 8. The carrier 8 houses a sun and planet gear assembly which operates a pawl 13 in order to lock out the main spring 22 after the belt 31 has been extracted, and fastened about the wearer's torso. The auxiliary spring 3 then provides the light bias. The sleeve portion 9 of carrier 8 acts as a bearing so that the carrier is free to rotate on the end of shaft 1. This end of the shaft has a sun gear 5 formed thereon which meshes with a planet gear 6. Planet gear 6 meshes with a gear ring 7, formed about a major part of the inner edge of carrier 8. Gear ring 7 is not a full circle, as apparent from FIG. 2, and the word "ring" is used broadly to cover such an incomplete or open ring of teeth. FIG. 2 also shows that the carrier 8 has a raised portion 10 forming a solid sector joining the respective ends of the arcuate toothed ring 7 and acting as an abutment to limit the orbital motion of planet gear 6 in both clockwise and anticlockwise directions. The arrows shows the direction of rotation of shaft 1 caused by belt extraction.

Returning to FIG. 1, carrier 8 also supports a toothed annulus 11, forming a ratchet, the teeth of which are normally engaged by a tooth 12 of a pawl 13. The pawl automatically engages the ratchet when the belt retracts slightly after being fastened about the wearer's torso. The pawl is disengaged following a predetermined orbital motion of the planet gear 6 when the belt is released and the required length retracted. However, before describing this in detail, a description will first be made of FIGS. 4 and 5 to illustrate the problem which is experienced when using a threaded member driven axially of a belt storage shaft to provide lost motion before disengaging a spring lock out mechanism.

In the arrangement shown in FIGS. 4 and 5, a belt storage shaft 41 is mounted for rotation in a frame 42. The rewind mechanism is mounted to the left of the frame (as shown) and an inertia locking mechanism (not shown), is mounted to the right.

One end of shaft 41 has a threaded bore 43 and an extension 44 which has attached thereto the inner end of an auxiliary spring 45, for applying a light bias and designed to allow only three to four turns between its unwound and its fully wound condition. The outer end of spring 45 is attached to the inner wall of a drum forming part of a driving member 46 which is keyed to a ratchet member 47. A central boss 48 of the ratchet member has attached thereto the inner end of a main spring 49, the outer end of which is attached to casing 50.

The central boss 48 has an oval bore 51 in which slidably fits the head of a screw threaded pawl control member 52. The screw threaded portion of the pawl control member engages the threaded bore 43 of shaft 41. Ratchet member 47 also has a shallow circular recess 53 at the outer end of the oval bore, and a row of inwardly facing ratchet teeth 54.

End cover 55 carries a pivot pin 56 for a pawl 57 which is spring loaded, by a spring 60, against the face of the ratchet member 47. The pawl 57 is a loose fit on pin 56 so that tilting of the pawl in directions into and out of the plane of the paper, as viewed in FIG. 5, is possible, as is normal pivoted movement about pin 56. The surface of the pawl which faces the ratchet member 47 has a small protruding portion 57' which is received in the recess 53 in the member 47. The protruding portion 57' is positioned on the pawl 57 such that it can engage the walls of recess 53 to limit the angular travel of the pawl. In FIG. 5 the pawl is shown at its extreme position in the anticlockwise direction, but the pawl is free to pivot in a clockwise direction about pin 56 until its tooth disengages from the ratchet ring 54, further movement being prevented by the engagement of the protruding portion 57' engaging the wall of recess 53.

When the protruding portion 57' is in the recess 53, the rear surface of the pawl 57 is flat against the face 59 of the ratchet member 47 and because of the spring bias of spring 60, a certain amount of friction exists between the two surfaces.

Operation of the mechanism will now be described:

Assuming first that the belt is fully wound on the reel and that to unroll the belt the shaft 41 is to be rotated in the direction indicated by the arrows of FIG. 4.

On initial rotation to unreel the belt, spring 45 is wound up until it approaches the coil bound condition. Further winding causes driving member 46 to rotate which in turn starts to wind up main spring 49. As spring 49 is wound the ratchet member 47 also rotates with driving member 46 and because of the friction between the ratchet member 46 and the pawl 57, the pawl rotates from the position shown in FIG. 5 in a clockwise direction about its pivot to a new position such that its tooth disengages from the ratchet teeth 54. Further pawl rotation is prevented by the engagement of its protruding portion with the wall of recess 53 in the ratchet member. Because the pawl tooth is held out of engagement with the teeth 54 by friction there is no clicking sound normally associated with ratchets, and the ratchet member 47 rotates until the desired amount of webbing is unreeled.

Assume now that the belt is buckled and that a small amount of webbing forming the belt is to be reeled in after the buckling operation. Upon initial rewind by the main spring, the pawl is carried by friction to the position shown in FIG. 5, at which point further anticlockwise direction of the movement of the pawl is prevented by engagement of its protruding portion with the wall of recess 53.

Because the pawl is now engaged with teeth 54, further anticlockwise motion of the ratchet member 47 is also prevented so that spring 49 is effectively locked out of the rewind system. Retraction of the webbing can now only take place by virtue of the energy stored in light spring 45, and in this condition the belt is very comfortable to wear.

When the belt is to be stored, light spring 45 continues to wind webbing until its energy is almost exhausted (after about 2 to 3 turns of spindle 41), but during this rotation the ratchet member 47 is fixed against rotation as is the pawl control member 52. However, because the pawl control member 52 is in screw threaded engagement to spindle 41 the relative rotation of the spindle and the pawl control member causes it to move to the left (as seen in FIG. 4). As the pawl control 52 moves to the left it engages the protruding portion of the pawl 57 and pushes it out of recess 53.

When the pawl is freed from the restraint imposed by the wall of recess 53, the main spring is able to rotate the ratchet member 47 and the pawl anticlockwise until the pawl disengages from the teeth 54. The pawl is driven anticlockwise until it engages stop 21. The energy stored in spring 49 is now released and the ratchet member 7 rotates rapidly until pawl control member 52 is screwed fully home in spindle 41, at this point the main spring acts to rewind the belt rapidly. Before the pawl control member 52 is screwed fully home, some of the energy of main spring 49 is used to rewind the small spring 45, and this helps to cushion the impact of the pawl control member homing in the spindle 41. However, the present invention seeks to avoid any problem which may be caused by fast axial movement of control member 52 after the pawl has been released.

Returning to the description of the preferred embodiment of the present invention and FIGS. 1 and 2, the pawl 13 is mounted for both pivoting and rocking about a pin 14 formed on the inner surface of an end plate of housing 4. Spring 15 urges the pawl to the right (as shown). The central portion of the pawl has a shaped boss 16 which is loosely inserted in a central hole 17 in the end of shaft 1 and it also has a raised circular portion 18. The planet wheel 6 carries a projection 19 which, when the planet wheel 6 is against the raised portion 10 of carrier 8, is in a radially outermost position, as shown in FIG. 2. The end of pawl 13 carries a friction drive member 20 which is urged against an outwardly facing edge 21 of carrier 8 by the spring 15.

Operation of the device shown in FIGS. 1 and 2 is as follows. When webbing, forming belt 31, is withdrawn from shaft 1, shaft 1 rotates in the direction shown by the arrow in FIG. 2, and causes spring 3 to be wound. As the shaft rotates, the planet wheel 6 orbits until its teeth meet the raised part 10 of the carrier 8. At this point, epicyclic movement of the planet gear is prevented and the assembly, comprising the shaft 1, planet wheel 6 and carrier 8, rotate as a single component causing spring 22 to be wound.

Similar to the arrangement described above with reference to FIGS. 4 and 5, the friction drive member 20 of the pawl 13 allows the ratchet teeth 11 to rotate silently. More specifically the friction drive member 20 is carried along in the direction of rotation of carrier 8 by contact with the edge 21, so that the pawl 13 pivots about pin 14 and its tooth 12 is disengaged from the annular ratchet 11. The pawl 13 is maintained in this position, by friction, whilst the webbing is withdrawn from shaft 1, the pivot movement of the pawl about pin 14 being limited by the clearance of boss 16 (which is a loose fit) in the hole 17 in the end of shaft 1. When sufficient webbing of belt 31 has been extracted and then allowed to retract by a small amount, the friction drive member 20, through contact with edge 21, rotates the pawl 13 to a locking position so as to engage one of the ratchet teeth on annulus 11. Further rotation of the carrier 8 is then prevented, due to engagement of pawl 13 and annular ratchet 11, and spring 22 is locked out. Only spring 3 then provides a rewinding force to apply a light bias to the belt worn by the user. This light bias is applied even if the wearer leans forward in his seat, because the planet gear 6 can orbit over a limited arcuate extent (best seen in FIG. 2) when the planet ring 7 (i.e. carrier 8) has been locked by pawl 13. This limited orbital movement of the planet gear 6 provides a measure of lost motion before the pawl 13 is disengaged from the annular ratchet 11 to reconnect the drive of the main spring 22 to the shaft 1.

With the mechanism in the condition just described, when the wearer unfastens his belt to relese it for storage, the auxiliary spring 3 drives shaft 1 which causes planet wheel 6 to orbit until projection 19 rides under the raised portion 18 of pawl 13. This causes the central boss 16 to be lifted out of hole 17, which in turn allows the pawl 13 to rotate to free the carrier 8. It will be appreciated that pawl 13 acts as a stop to prevent rotation of carrier 8 only whilst its boss 16 is held captive in the hole 17. As soon as the boss 16 is pushed out, the pawl 13 can rotate on pin 14. Rapid rotation of carrier 8 results after disengagement of pawl 13 until the raised part 10 (which may have a spring cushion device) of the carrier engages planet wheel 6, at which point full driving torque is applied to shaft 1 to give rapid rewind.

It will be appreciated that FIGS. 1 and 2 are only schematic drawings and that, in practice, some means would be included to retain the boss 16 adjacent the sun gear 5 when displaced from the bore in the end of shaft 1. For example, the end of shaft 1 (or the side of gear 5) may define an annular lip 25, as shown in FIG. 3, for engaging the end of boss 16. This lip limits the rotation of pawl 13 on pin 14 by an extent which enables disengagement of tooth 12 from the annular ratchet 11 but which does not cause frictional engagement to be lost between the friction drive member 20 and the opposite edge 21 of carrier 8. This frictional engagement enables the pawl 13 to be rotated about pin 14, when the belt is again extracted from shaft 1, whereby the boss 16 re-enters the hole 17.

What I claim is:

1. A safety belt retractor, comprising: a main spring; an auxiliary spring; a casing to which one end of each of said springs is anchored; a shaft which rotates when a safety belt is extracted from and retracted by the retractor, the auxiliary spring having its other end connected to said shaft for applying a continuous bias thereto; a sun and planet gear assembly including a gear ring, a planet gear and a sun gear in drivable engagement with one another, said shaft being fast with the sun gear, the other end of said main spring being coupled to said gear ring; a stop to limit orbital motion of the planet gear when the shaft is rotated, whereby the shaft is drivably coupled to the main spring through said assembly; and, a main spring lock out mechanism, said mechanism including means for securing the gear ring against rotation, after the belt has been extracted, whereby the main spring stores its wound energy and its drive is disconnected from the shaft.

2. A safety belt retractor according to claim 1 wherein the spring lock out mechanism is in the form of a ratchet and pawl.

3. A safety belt retractor according to claim 1, wherein said spring lock out mechanism comprises a toothed annulus and a pawl, said annulus being fast with the gear ring of the sun and planet gear assembly and said pawl being mounted for tilting and pivoting movement, said pawl engaging said annulus to lock out the main spring and said pawl being disengaged from said annulus, by the orbital motion of the planet gear, to reconnect said main spring to said shaft.

4. A safety belt retractor according to claim 3 wherein the tilting and pivoting of the pawl is effected by the planet gear which, during its orbital motion, comes into contact with the pawl.

5. A safety belt retractor according to claim 4, wherein the pawl is pivoted so as to be disengaged from the annulus when the sun and planet gear assembly rotates as the belt is extracted.

6. A safety belt retractor according to claim 5, wherein the pawl is pivotally mounted on the casing adjacent the end of said belt storage shaft and including biasing means, connected between said casing and said pawl, for urging said pawl into engagement with said toothed annulus.

7. A safety belt retractor according to any one of claims 1, 2, 4, 3, 5 or 6 wherein the sun and planet gear assembly comprises said gear ring defined by internal teeth on a cup shaped member having a hollow stub to which said other end of the main spring is attached.

8. A safety belt retractor according to claim 7 wherein the hollow stub is coaxial with the belt storage shaft and the end of the shaft defines, or has attached thereto, the sun gear wheel.

9. A safety belt retractor according to claim 8 wherein the planet gear is fitted between the gear ring and the sun gear and has a projection thereon for actuating the spring lock out mechanism.

10. A safety belt retractor according to claim 9 wherein said cup shaped member defines an arcuate toothed track and includes a solid sector joined by the respective ends of said track, said track being engaged by the planet gear and said sector being spaced from the sun gear and acting as said stop for limiting the orbital motion of the planet gear in both clockwise and anticlockwise directions.

* * * * *